US009568944B2

(12) United States Patent
Worrell et al.

(10) Patent No.: US 9,568,944 B2
(45) Date of Patent: Feb. 14, 2017

(54) DISTRIBUTED TIMER SUBSYSTEM ACROSS MULTIPLE DEVICES

(71) Applicant: Cavium, Inc., San Jose, CA (US)

(72) Inventors: Frank Worrell, San Jose, CA (US); Bryan W. Chin, San Diego, CA (US)

(73) Assignee: CAVIUM, INC., San Jose, CA (US)

( * ) Notice: Subject to any disclaimer, the term of this patent is extended or adjusted under 35 U.S.C. 154(b) by 111 days.

(21) Appl. No.: 14/542,065

(22) Filed: Nov. 14, 2014

(65) Prior Publication Data
US 2016/0139625 A1 May 19, 2016

(51) Int. Cl.
*G06F 1/12* (2006.01)
*G06F 1/10* (2006.01)

(52) U.S. Cl.
CPC .. *G06F 1/12* (2013.01); *G06F 1/10* (2013.01)

(58) Field of Classification Search
CPC ..................................... G06F 1/10; G06F 1/12
USPC .......................................................... 713/601
See application file for complete search history.

(56) References Cited

U.S. PATENT DOCUMENTS

| | | | | |
|---|---|---|---|---|
| 5,905,869 A * | 5/1999 | Hornung | .................. | G06F 1/14 709/228 |
| 6,351,821 B1 * | 2/2002 | Voth | ..................... | H04J 3/0667 709/248 |
| 6,687,756 B1 * | 2/2004 | Rawson, III | .............. | G06F 1/10 709/248 |
| 7,058,838 B2 * | 6/2006 | Xu | ............................ | G06F 1/14 368/46 |
| 2002/0143998 A1 * | 10/2002 | Rajagopal | ................. | G06F 1/12 709/248 |
| 2005/0033947 A1 * | 2/2005 | Morris | ..................... | G06F 1/14 713/1 |
| 2005/0228902 A1 * | 10/2005 | Lienhart | ................... | G06F 1/12 709/248 |
| 2010/0058095 A1 * | 3/2010 | Malek | ....................... | G06F 1/12 713/375 |
| 2012/0089815 A1 * | 4/2012 | Cardinell | .................. | G06F 1/14 712/31 |
| 2012/0275501 A1 * | 11/2012 | Rotenstein | ............ | H04J 3/0667 375/220 |
| 2013/0314425 A1 * | 11/2013 | Hum | ..................... | G06F 1/3203 345/502 |
| 2014/0245057 A1 * | 8/2014 | Wroblewski | ........ | G06F 11/1679 713/375 |

(Continued)

Primary Examiner — Vincent Tran
(74) Attorney, Agent, or Firm — pkalousek.ip

(57) ABSTRACT

Multiple ARM devices, each having multiple processing elements, linked together by an interconnect to form a coherent memory fabric in which each device has access to all of the processing elements located on all of the devices that are part of the coherent memory fabric. In order to comply with the ARM architecture, the system must have a global timer that is accessible to all of the ARM devices so that each of the devices can maintain the same timer value. The devices, systems, and methods disclosed herein provide for initial synchronization between multiple ARM devices that are joined together to form a coherent memory fabric. The initial synchronization is achieved by determining an offset between the timers of each ARM device and then minimizing the offset. The synchronization may be periodically checked and adjusted, as necessary, to maintain proper synchronization.

18 Claims, 4 Drawing Sheets

(56) References Cited

U.S. PATENT DOCUMENTS

| | | | |
|---|---|---|---|
| 2014/0281036 A1* | 9/2014 | Cutler | H04L 29/0854 |
| | | | 709/248 |
| 2015/0074442 A1* | 3/2015 | Shahid | G06F 1/12 |
| | | | 713/500 |
| 2016/0182538 A1* | 6/2016 | Teddy | H04L 63/1416 |
| | | | 726/23 |

* cited by examiner

DISTRIBUTED TIMER SUBSYSTEM ACROSS MULTIPLE DEVICES

CROSS-REFERENCE TO RELATED APPLICATIONS

The present application is related to application Ser. No. 14/541,769 entitled "DISTRIBUTED TIMER SUBSYSTEM," filed concurrently with this application, assigned to the assignee hereof and hereby expressly incorporated by reference in its entirety.

FIELD

The invention disclosed herein generally relates to timer synchronization and more particularly to apparatuses, systems, and methods for distributing a common timer value to a plurality of processing elements disposed on multiple silicon devices.

BACKGROUND

Many of today's computing devices (e.g., laptop computers, desktop computers, smartphones, tablets, and servers) utilize processors that conform to an instruction set architecture known commercially as the ARM™ (Advanced RISC Machines) architecture. ARM processors may have multiple processing elements located on a single device (e.g., processor). According to the ARM architecture, when a device has multiple processing elements, each processing element must have access to a global system counter (e.g., timer). Such a requirement ensures that all of the processing elements have a consistent notion of time.

In some current systems that have multiple processing elements (e.g., cores) on a single device, each of the processing elements has a dedicated parallel bus that is used to send the global timer value to that particular processing element, and each time the global timer value is updated for the processing elements, the new global timer value is sent again over the dedicated buses. However, such a configuration can cause problems when a large number of processing elements are present on the single device.

Synchronization is even more difficult to achieve in systems that utilize multiple devices, each having multiple processing elements that all must have access to the same global system counter.

SUMMARY

Multiple ARM devices, each having multiple processing elements, may be linked together by an interconnect to form a coherent memory fabric in which each device has access to all of the processing elements located on all of the devices that are part of the coherent memory fabric. In order to comply with the ARM architecture, the system must have a global timer that is accessible to all of the ARM devices so that each of the devices can maintain the same timer value. The devices, systems, and methods disclosed herein provide for initial synchronization between multiple ARM devices that are joined together to form a coherent memory fabric. The initial synchronization is achieved by determining an offset between the timers of each ARM device and then minimizing the offset. In operation, the synchronization may be periodically checked and adjusted, as necessary, to maintain proper synchronization.

The offset between the timers of the ARM devices can be minimized by adjusting one or more of the timers of the ARM devices that comprise the coherent memory fabric. More specifically, the system can adjust the rate at which one or more of the timers of the ARM devices is incremented. In other instances, the adjustment can include reading the timer value of a master timer in a master ARM device and writing that timer value into one or more other ARM devices.

DETAILED DESCRIPTION

Multiple ARM devices, each having multiple processing elements, may be linked together by an interconnect to form a coherent memory fabric in which each device has access to all of the processing elements located on all of the devices that are part of the coherent memory fabric. There are several advantages to creating a coherent memory fabric. For example, the system can dynamically allocate memory resources depending on the changing needs of the system in a manner that could not be realized in non-coherent systems. In addition, application software can run on a system connected by a coherent fabric without regard to which of the devices is supplying the processor cores, memory or I/O (e.g., Input/Output).

However, the coherent memory fabric can also introduce significant delays when the system traverses the fabric in order to access memory located on a different device. These delays are non-trivial since the ARM architecture requires that the system have a global timer that is accessible to all of the ARM devices so that each of the devices can maintain the same timer value. Thus, any system that utilizes multiple ARM devices to create a coherent memory fabric, as disclosed herein, must ensure proper synchronization between the ARM devices as well as within each of the respective ARM devices. Several techniques for addressing these various requirements of the ARM architecture are discussed below.

Figure 1A:
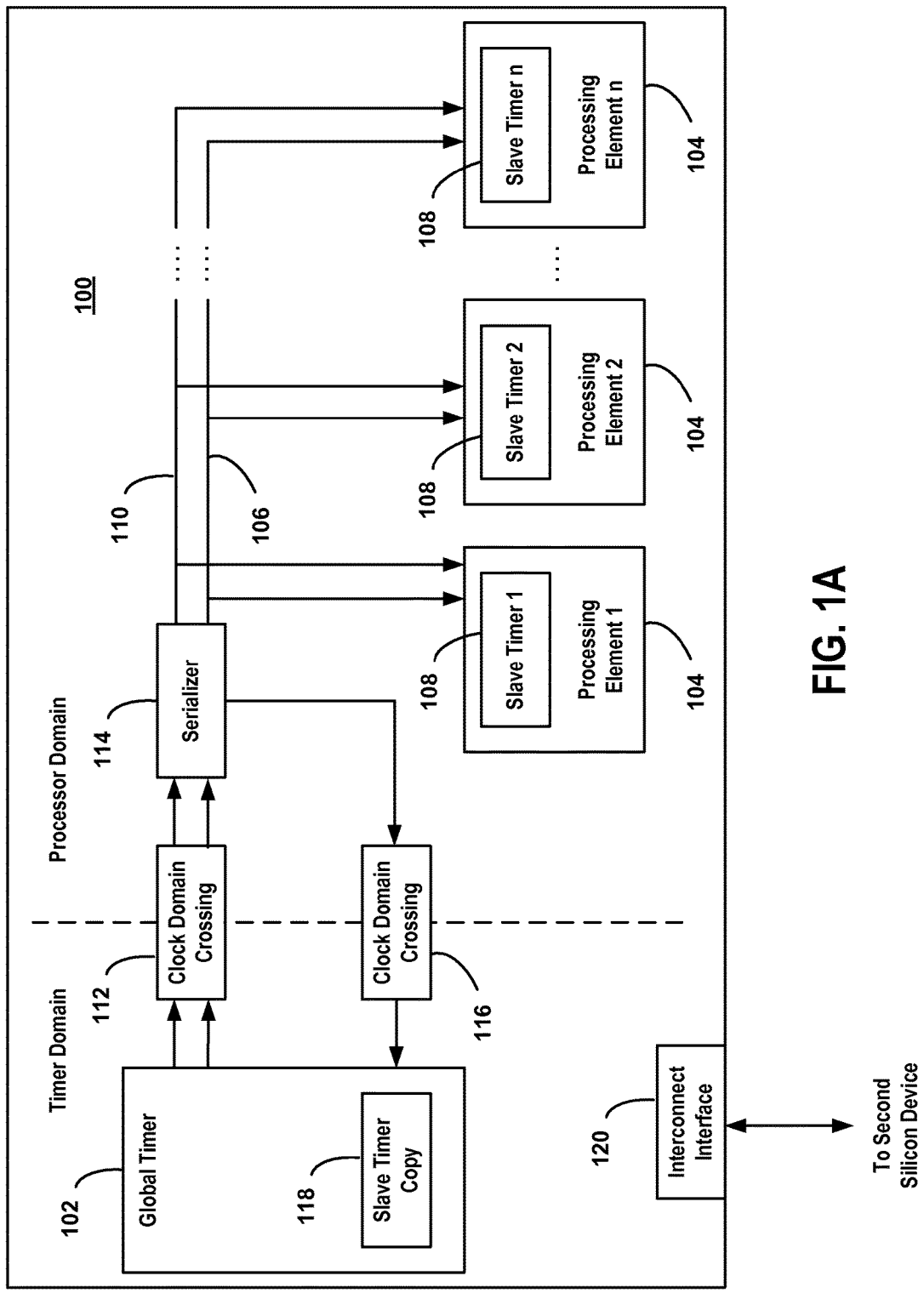
FIG. 1A is an illustration of a first silicon device that is coupled by an interconnect to a second silicon device (shown in FIG. 1B) to create a coherent memory fabric.

FIG. 1A is an illustration of a first silicon device that is coupled by an interconnect to a second silicon device (shown in FIG. 1B) to create a coherent memory fabric. For the example of FIG. 1A, the first silicon device 100 is configured in accordance with an Advanced RISC Machines™ (ARM) architecture. The first silicon device 100 shown in FIG. 1A may also be referred to herein as an ARM processor or chip.

The first silicon device 100 comprises a global timer 102 that maintains a global timer value. The first silicon device 100 also comprises a plurality of processing elements 104. For the example of FIG. 1, the processing elements 104 are processing cores. The first silicon device 100 can have any number, n, of processing elements 104. However, in some instances, the first silicon device 100 may have 48 processing elements 104.

In order that the processing elements 104 have a consistent notion of time (e.g., with each other and with the global timer 102), the global timer 102 distributes a global timer value to each processing element 104. More specifically, the global timer 102 transmits the global timer value to each of the processing elements 104 over the serial bus 106, which is coupled to the global timer 102 and to each of the processing elements 104. Each of the processing elements 104 comprises a slave timer 108.

Upon receiving the global timer value over the serial bus 106, each of the processing elements 104 synchronizes their respective slave timers 108 with the global timer value. When it is time to update the slave timers 108, the global timer 102 sends an increment signal over line 110. The increment signal is generally much smaller in size than the size of the global timer value. For example, the increment signal could be as small as a single bit, indicating that each of the slave timers 108 should be incremented. In operation, the increment signal is sent frequently enough such that software running on each of the processing elements 104 will always have a slave timer 108 that is a valid representation of the global timer.

In this regard, the global timer 102 operates in a first clock domain in the example shown in FIG. 1. Here, the first clock domain is referred to as the "Timer Domain." Time may be measured in the Timer Domain in any unit, such as seconds, milliseconds, microseconds, or in a relative sense, such as cycles of a repeating clock function. Just as the global timer 102 operates in a first clock domain, the processing elements 104 operate in a second clock domain referred to as the "Processor Domain." Time may be measured in the Processor Domain in any unit, such as seconds, milliseconds, microseconds, or in a relative sense, such as cycles of a repeating clock function. In some instances, the Timer Domain and the Processor Domain may be synchronized. In such instances, no clock domain crossing circuitry is necessary. In other instances, any difference in phase and/or frequency between the Timer Domain and the Processor Domain must be taken into account.

For example, when the first clock domain and the second clock domain are not synchronized, the global timer value must be transformed from the first clock domain to the second clock domain. This is accomplished in FIG. 1 by first clock domain crossing circuitry 112.

Once the global timer value is transformed by the first clock domain crossing circuitry 112 into the second clock domain, the serializer 114 translates the transformed global timer value into a format that can be transmitted across the serial bus 106 to the processing elements 104. Although not explicitly shown in FIG. 1A, each processing element 104 includes a deserializer to reconstruct the global timer value from the signal received over the serial bus 106.

The second clock domain crossing circuitry 116 issues a command packet instructing the global timer 102 to either "load" the most recently broadcast global timer value into the slave timer copy 118 or to "increment" the value contained in the slave timer copy 118. This command packet can be represented by two bits—a valid bit and a command bit. When the command is valid, the second bit indicates that the slave timer copy 118 should either be incremented or loaded with the most recently broadcast global timer value. Since the most recently broadcast global timer value is known within the global timer 102, the serializer 114 need only send the command packet through the clock domain crossing 116.

By maintaining the slave timer copy 118, the global timer 102 can represent the same value to software when reading from the slave timer copy 118 as if the software had read directly from the slave timers 108 contained in each of the processing elements 104. Synchronization of these values within the resolution of software observability is guaranteed by design. That is, the design takes into account the necessary delays introduced by the clock domain crossings and delays in the serializer 114 and busses 110 and 106.

The second silicon device 200 functions in a manner similar to the first silicon device 100. For example, the second silicon device 200 comprises a global timer 202 that maintains a global timer value for the second silicon device 200. The second silicon device 200 also comprises a plurality of processing elements 204. For the example of FIG. 1B, the processing elements 204 are processing cores. The second silicon device 200 can have any number, n, of processing elements 204. However, in some instances, the second silicon device 200 may have 48 processing elements 204.

In order that the processing elements 204 have a consistent notion of time (e.g., with each other and with the global timer 202), the global timer 202 distributes a global timer value to each processing element 204. More specifically, the global timer 202 transmits the global timer value to each of the processing elements 204 over the serial bus 206, which is coupled to the global timer 202 and to each of the processing elements 204. Each of the processing elements 204 comprises a slave timer 208.

Upon receiving the global timer value over the serial bus 206, each of the processing elements 204 synchronizes their respective slave timers 208 with the global timer value. When it is time to update the slave timers 208, the global timer 202 sends an increment signal over line 210. The increment signal is generally much smaller in size than the size of the global timer value. For example, the increment signal could be as small as a single bit, indicating that each of the slave timers 208 should be incremented. In operation, the increment signal is sent frequently enough such that software running on each of the processing elements 204 will always have a slave timer 208 that is a valid representation of the global timer.

Similar to the configuration shown in connection with FIG. 1A, the global timer 202 operates in a first clock domain ("Timer Domain"), and the processing elements 204 operate in a second clock domain ("Processor Domain"). Time may be measured in the Timer Domain and the Processor Domain in any unit, such as seconds, milliseconds, microseconds, or in a relative sense, such as cycles of a repeating clock function. In some instances, the Timer Domain and the Processor Domain may be synchronized. In such instances, no clock domain crossing circuitry is necessary. In other instances, any difference in phase and/or frequency between the Timer Domain and the Processor Domain must be taken into account.

For example, when the first clock domain and the second clock domain are not synchronized, the global timer value of the global timer 202 must be transformed from the first clock domain to the second clock domain. This is accomplished in FIG. 1B by first clock domain crossing circuitry 212. Once the global timer value is transformed by the first clock domain crossing circuitry 212 into the second clock domain, the serializer 214 translates the transformed global timer value into a format that can be transmitted across the serial bus 206 to the processing elements 204. Although not explicitly shown in FIG. 1B, each processing element 204 includes a deserializer to reconstruct the global timer value from the signal received over the serial bus 206.

The second clock domain crossing circuitry 216 issues a command packet instructing the global timer 202 to either "load" the most recently broadcast global timer value into the slave timer copy 218 or to "increment" the value contained in the slave timer copy 218. This command packet can be represented by two bits—a valid bit and a command bit. When the command is valid, the second bit indicates that the slave timer copy 218 should either be incremented or loaded with the most recently broadcast global timer value. Since the most recently broadcast global timer value is known within the global timer 202, the serializer 214 need only send the command packet through the clock domain crossing 216.

By maintaining the slave timer copy 218, the global timer 202 can represent the same value to software when reading from the slave timer copy 218 as if the software had read directly from the slave timers 208 contained in each of the processing elements 204. Synchronization of these values within the resolution of software observability is guaranteed by design. That is, the design takes into account the necessary delays introduced by the clock domain crossings and delays in the serializer 214 and busses 210 and 206.

In addition to maintaining proper synchronization between the global timer 102 and the slave timers 108 of the first silicon device 100, the system is further configured to ensure synchronization between the global timer 102 of the first silicon device 100 and the global timer 202 of the second silicon device 200. Although not explicitly shown in FIGS. 1A and 1B, the first silicon device 100 and the second silicon device 200 may have independent clock sources. Since the independent clock sources might not have the same frequency or phase as each other, any difference (e.g., offset) between the global timers of the first and second silicon devices must be determined and minimized in order to maintain synchronization between the global timers.

Figure 1B:
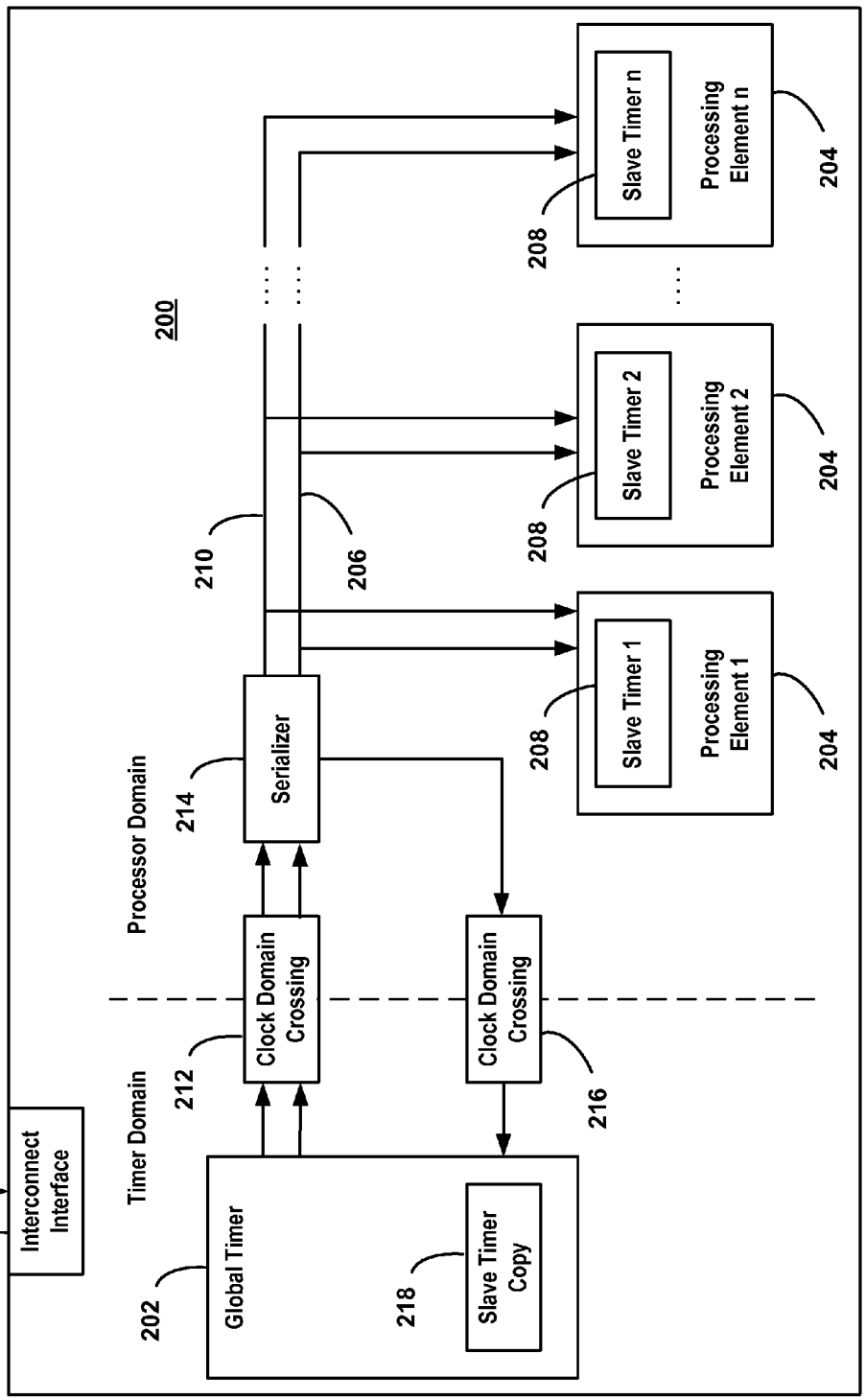
FIG. 1B is an illustration of a second silicon device that is coupled by an interconnect to a first silicon device (shown in FIG. 1A) to create a coherent memory fabric.

As used herein, the first silicon device 100 may be referred to as "Device A" and the second silicon device 200 may be referred to as "Device B" since Device A is considered to maintain the master global timer value, with which Device B is synchronized. Although only two silicon devices are shown in the example of FIGS. 1A and 1B, other systems could include more than two silicon devices. In these other systems, Device A would be considered to maintain the master global timer value, and all of the other silicon devices would be configured to synchronize their respective global timers with the global timer of Device A. The choice of which device is the master global timer and which device is the slave global timer is arbitrary and may change at any time. One definition of master and slave timer is that the timer that is furthest ahead in value is the master timer and the timer that is behind in value is the slave timer.

As mentioned above, the first silicon device 100 and the second silicon device 200 are coupled together by an interconnect such that both the first and second silicon devices have access to any of the processing elements disposed on both the first and second silicon devices. More specifically, the first silicon device 100 is coupled to the interconnect via an interconnect interface 120, and the second silicon device 200 is coupled to the interconnect via an interconnect interface 220. Although any suitable interconnect may be used, for the example of FIGS. 1A and 1B, the interconnect is a high speed interconnect known commercially as CCPI, which stands for Cavium Coherent Processor Interconnect™. In some instances, the interconnect may be serial, parallel, or have multiple serial channels. The interconnect may also be packet or message based.

In order to ensure proper synchronization between the global timer 102 of the first silicon device 100 and the global timer 202 of the second silicon device 200, at least one of the first silicon device 100 and the second silicon device 200 must determine the offset (e.g., difference) between the global timer 102 of the first silicon device 100 and the global timer 202 of the second silicon device 200. For the example shown in FIGS. 1A and 1B, the offset is determined by subtracting a communication delay over the interconnect between the first and second silicon devices from a total delay observed between the first and second silicon devices.

In order to measure the total delay between Device A (e.g., first silicon device 100) and Device B (e.g., second silicon device 200), software on Device A transmits a time synchronization ("time sync") message from Device A to Device B. When the interconnect interface 120 of Device A receives the time sync message, the current global timer value of Device A ("$T_{aTx}$") is captured and written into the time sync message before the time sync message is sent to Device B over the interconnect. Alternatively, the Device A may capture $T_{aTx}$ in a register local to Device A instead of inserting this into the time sync message. Upon receipt of the time sync message, Device B captures the current global timer value of Device B ("$T_{bRx}$") and writes $T_{bRx}$ into the time sync message, which is then placed in a mailbox on Device B. Thus, the time sync message waiting in the mailbox of Device B contains both $T_{aTx}$ and $T_{bRx}$. Alternatively, the values of $T_{bRx}$ can be captured in a local register in Device B instead of inserting the time into the time sync message. It should be noted that the time sync message can be any message transmitted between the two Devices A and B. In addition, in the presence of errors where packets on the interconnect between devices A and B are retransmitted between Devices A and B, either hardware or software will have to discard the one or more timestamps associated with the failed packet communications.

Software on Device B recognizes the time sync message from Device A waiting in the mailbox and initiates transmission of a new time sync message to Device A. When the interconnect interface 220 receives the time sync message, the current global timer value of Device B ("$T_{bTx}$") is captured and written into the time sync message before the time sync message is sent to Device A over the interconnect. Upon receipt of the time sync message, Device A captures the current global timer value of Device A ("$T_{aRx}$") and writes $T_{aRx}$ into the time sync message, which is then placed in a mailbox on Device A. Thus, the time sync message waiting in the mailbox of Device A contains both $T_{bTx}$ and $T_{aRx}$.

The total delay ("d1") between Device A and Device B can be represented by $d1=T_{bRx}-T_{aTx}$. The total delay ("d2") between Device B and Device A can be represented by $d2=T_{aRx}-T_{bTx}$. The communication delay from Device A to Device B is referred to as D, and the communication delay from Device B to Device A is also referred to as D since the two communication delay values are assumed to be the same.

The total delay, d1, consists of (1) the communication delay, D, over the interconnect between Device A and Device B, and (2) the actual offset (e.g., difference) between the global timer of Device A and the global timer of Device B, where this offset is called "X." The total delay, d2, consists of (1) the communication delay, D, over the interconnect between Device B and Device A, and (2) the actual offset (e.g., difference) between the global timer of Device B and the global timer of Device A, where this offset is called "Y." Thus, X=−Y since the offset between the two devices must be a constant amount.

Given the information available to Device A and to Device B, at least one of Device A and Device B are configured to determine the offset, X, between the global timer of Device A and the global timer of Device B using the following equations:

$$d1=T_{bRX}-T_{aTX}=X+D$$

$$d2=T_{aRX}-T_{bTX}=Y+D$$

$$Y=-X$$

$$d2=T_{aRX}-T_{bTX}=-X+D$$

$$d1-d2=2X$$

$$X=(d-d2)/2$$

Once the offset between the global timer of Device A and the global timer of Device B is determined, the offset is minimized by adjusting at least one of the global timers of Device A and Device B. For example, the offset can be minimized by periodically writing a timer value from the global timer of Device A into the global timer of Device B. However, this technique is not ideal since additional delays may be introduced by the time required to read the global timer of Device A and by the time required to write the value into the global timer of Device B. As these delays maybe non-deterministic, adjusting the global timer in this fashion is problematic.

Figure 2:
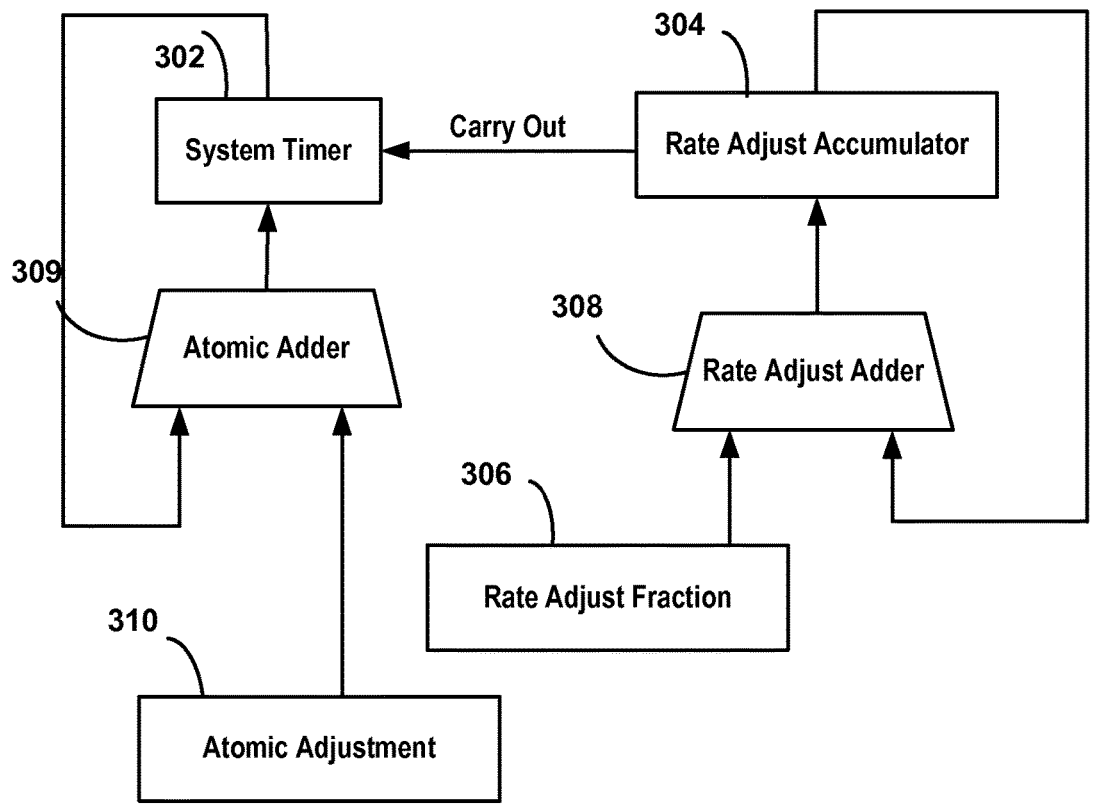
FIG. 2 is an illustration showing logical blocks that demonstrate how the rate of the timers of the silicon devices of FIGS. 1A and 1B can be adjusted.

Preferably, the offset between the global timer of Device A and the global timer of Device B may be minimized by employing the circuit shown in FIG. 2. The offset X can be atomically adjusted to system counter 302 by software writing the value to the atomic adjustment register 310. The atomic adjustment will be applied exactly once to the current value of the system timer such that the atomic adder 309 adjusts the system timer by the atomic adjustment amount. For example, if Device A is 10 time units ahead of Device B, the atomic adjustment register 310 on Device B can be written with the value 10. This write will cause the atomic adder 309 of Device B to add the value 10 to the system timer 302 of Device B once, thus bringing the system timers 302 of Devices A and B to the same notion of time.

The foregoing method of adjusting the global timer (e.g., System Timer) can be used to synchronize the global timers of Devices A and B as well as to periodically check the synchronization and make any necessary adjustments. Moreover, although the foregoing discussion regarding FIG. 2 has focused on minimizing the offset between the global timers of Devices A and B, the logic of FIG. 2 may also be implemented to compensate for static error in a clock reference (e.g., from a crystal oscillator) that may be due to a manufacturing error, drift due to age, temperature variations, or other factors.

Alternatively, the offset between the global timer of Device A and the global timer of Device B is minimized by adjusting the rate at which at least one of the global timers of Device A and B is incremented. FIG. 2 shows logical blocks that demonstrate how the rate of the global timers of the silicon devices of FIGS. 1A and 1B can be adjusted. For the purposes of this discussion, we will presume that Device A (e.g., the first silicon device 100, shown in FIG. 1A) is the master device and that the system 300 will adjust the rate at which the global timer 202 of Device B (e.g., the second silicon device 200, shown in FIG. 1B) is incremented in order to minimize the offset between the global timers of Device A and Device B.

Circuitry that implements the logic shown in FIG. 2 is present in both Device A and Device B and operates to speed up or slow down the global timer that is lagging behind or running ahead of the other global timer. However, since Device A is the master in this scenario, the global timer 202 of Device B will always be the timer whose rate is adjusted using a circuit that implements the logic shown in FIG. 2.

In operation, the System Timer 302 (e.g., global timer) is incremented each time the Rate Adjust Accumulator 304 reaches a particular value and sends a Carry Out signal to the System Timer 302. The value that indicates that the Carry Out signal should be sent is the value represented when all of the binary bits of the Rate Adjust Accumulator 304 are set to "1." Alternatively, the Carry Out signal can be sent when the Rate Adjust Accumulator 304 reaches or exceeds some threshold value or when the Rate Adjust Accumulator 304 wraps around modulo some threshold value.

The value contained in the Rate Adjust Accumulator 304 is added to the value contained in the Rate Adjust Fraction 306 by the adder 308. The result of this addition operation is written into the Rate Adjust Accumulator 304. This process continues to repeat in order to generate the Carry Out signal, which prompts the System Timer 302 to increment.

When the System Timer 302 needs to increment more frequently in order to minimize the offset between the global timers of Devices A and B, the value contained in the Rate Adjust Fraction 306 must be modified so that the Carry Out Signal is generated at a faster rate. This procedure can be seen by the following example.

Assume that the System Timer of A runs at 1 MHz, which is generated using a 1 GHz reference clock. The Rate Adjust Accumulator in both Device A and Device B count from 0 to (100,000−1). As mentioned above, when either Rate Adjust Accumulator wraps around, the corresponding global timer is incremented by 1.

For Device A, a 1 GHz reference clock causes the Rate Adjust Fraction of Device A to be added to the Rate Adjust Accumulator of Device A. The Rate Adjust Fraction of Device A is set to 100 units so that the 1 GHz reference clock is effectively divided by 1000, yielding a System Timer for Device A with a period of 1000 ns (1.0 MHz).

For Device B, the reference clock runs at 800 MHz and the Rate Adjust Fraction of Device B is initially set to 100 units. Thus, the 800 MHz clock is divided by 1000, yielding a System Timer for Device B with a period of 1250 ns (0.8 MHz). Accordingly, the offset between the System Timer for Device A and the System Timer for Device B is 250 ns since it takes the System Timer of Device B 250 ns longer to increment than the System Timer of Device A. In order to minimize the offset and for the System Timer of Device B to count with a period of 1000 ns, the Rate Adjust Fraction for Device B must be increased from 100 units.

The System Timer of Device B currently increments with a period of 1.25 ns (1/800 MHz). However, the Rate Adjust Accumulator of Device B needs to reach 100,000 after 1000 ns. Here, 1000 ns/1.25 ns=800 updates. Thus, 100,000/800=125 units per update. Accordingly, the Rate Adjust Fraction of Device B should be set to 125 units so that the System Timer of Device B will have the same period (e.g., 1000 ns) as the System Timer of Device A. A similar adjustment to the Rate Adjust Fraction of Device B can be made to account for any differences in phase between the System Timers. In other examples where the System Timer of Device B needs to be slowed down, the Rate Adjust Fraction of Device B would need to be decreased by a number of units calculated to minimize the offset.

The foregoing method of adjusting the rate at which the global timer (e.g., System Timer) is incremented can be used to synchronize the global timers of Devices A and B as well as to periodically check the synchronization and make any necessary rate adjustments. Moreover, although the foregoing discussion regarding FIG. 2 has focused on minimizing the offset between the global timers of Devices A and B, the logic of FIG. 2 may also be implemented to compensate for static error in a clock reference (e.g., from a crystal oscillator) that may be due to a manufacturing error, drift due to age, temperature variations, or other factors.

Figure 3:
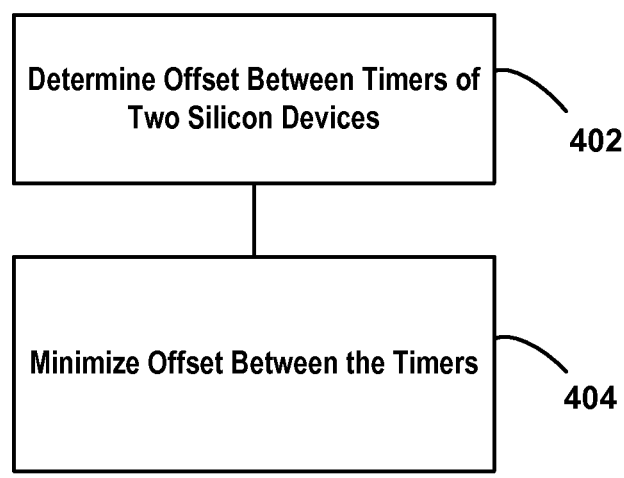
FIG. 3 is a flowchart showing a method of operating the devices shown in FIGS. 1A and 1B.

FIG. 3 is a flowchart showing a method of operating the devices shown in FIGS. 1A and 1B. The method begins at step 402 by determining an offset between a timer of a first silicon device configured in accordance with an Advanced RISC Machines™ (ARM) architecture and a timer of a second silicon device configured in accordance with the ARM architecture. The first silicon device has at least one processing element, and the second silicon device has at least one processing element. The first and second silicon devices are coupled by an interconnect such that both the first and second silicon devices have access to any of the processing elements disposed on both the first and second silicon devices.

In some instances, determining the offset comprises subtracting a communication delay over the interconnect between the first and second silicon devices from a total delay observed between the first and second silicon devices.

At step 404, the offset between the timers of the first and second silicon devices is minimized. In some instances, minimizing the offset comprises adjusting at least one of the timers of the first and second silicon devices. For example, adjusting at least one of the timers could include adjusting a rate at which at least one of the timers of the first and second silicon devices is incremented. Alternatively, adjusting at least one of the timers could include periodically writing a timer value from the timer of the first silicon device into the timer of the second silicon device.

The functionality of the systems, devices, and their respective components, as well as any method steps and blocks described herein may be implemented in hardware or a combination of hardware and software or firmware executed by a processor. The software/firmware may be one or more programs having sets of instructions (e.g., code segments) executable by one or more digital circuits or processors, such as microprocessors, DSPs, embedded controllers, or intellectual property (IP) cores. If implemented in software/firmware, the instructions or code may be stored on one or more computer-readable media, such as a solid-state memory. Computer-readable medium includes any suitable computer storage medium. A storage medium may be any available medium that can be accessed by a computer. By way of example, and not limitation, such computer-readable medium can comprise RAM, ROM, EEPROM, NAND/NOR Flash, CD-ROM, or other solid-state storage, optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable medium.

The various embodiments described herein include a non-volatile, non-transitory computer readable medium such as, but not limited to, a server memory, CD, DVD, or other non-volatile memory that stores code (i.e. executable instructions) that may be executed by one or more processors of a manufacturing process. As such, an integrated circuit having the components, logic, etc. described herein may be manufactured by processing such code, examples of which include, but are not limited to, hardware description language (HDL) instructions and/or data, a Netlist, or some other descriptive language used in an electronic design automation (EDA) system such as an integrated circuit fabrication system. Thus one or more processors of a manufacturing system may execute such executable instructions by reading the computer readable medium to setup manufacturing of an integrated circuit having the features and functions, and being able to perform the methods of operation, of the various embodiments herein described.

Other embodiments and modifications of the methods, devices, systems and apparatuses described above will occur readily to those of ordinary skill in the art in view of these teachings. Thus, the foregoing description is illustrative and not restrictive. The invention is to be limited only by the following claims, which cover all such other embodiments and modifications, when viewed in conjunction with the above specification and accompanying drawings. The scope of the invention should, therefore, not be limited to the above description, but instead should be determined with reference to the appended claims along with their full scope of equivalents.

What is claimed is:

1. An apparatus comprising:
a first silicon device configured in accordance with an Advanced RISC Machines™ (ARM) architecture, the first silicon device having a timer and at least one processing element;
a second silicon device configured in accordance with the ARM architecture, the second silicon device having a timer and at least one processing element;
an interconnect coupled between the first silicon device and the second silicon device such that both the first and second silicon devices have access to any of the processing elements disposed on both the first and second silicon devices; and
at least one of the first and second silicon devices configured to determine an offset between the timer of the first silicon device and the timer of the second silicon device in accordance with a total delay of a first synchronization message transmitted from the first silicon device to the second silicon device and a total delay of a second time synchronization message transmitted from the second silicon device to the first silicon device.

2. The apparatus of claim 1, wherein at least one of the first and second silicon devices is configured to determine the offset by subtracting a communication delay over the interconnect between the first and second silicon devices from the total delay observed between the first and second silicon devices.

3. The apparatus of claim 1, wherein at least one of the first and second silicon devices is configured to minimize the offset by adjusting at least one of the timers of the first and second silicon devices.

4. The apparatus of claim 3, wherein at least one of the first and second silicon devices is configured to minimize the offset by adjusting a rate at which at least one of the timers of the first and second silicon devices is incremented.

5. The apparatus of claim 3, wherein at least one of the first and second silicon devices is configured to minimize the offset by periodically writing a timer value from the timer of the first silicon device into the timer of the second silicon device.

6. The apparatus of claim 1, wherein each of the processing elements of the first silicon device comprises a slave timer configured to receive a timer value from the timer of the first silicon device, and each of the processing elements of the second silicon device comprises a slave timer configured to receive a timer value from the timer of the second silicon device.

7. A method comprising:
determining an offset between a timer of a first silicon device configured in accordance with an Advanced RISC Machines™ (ARM) architecture and a timer of a second silicon device configured in accordance with the ARM architecture, the first silicon device having at least one processing element and the second silicon device having at least one processing element, the first and second silicon devices coupled by an interconnect such that both the first and second silicon devices have access to any of the processing elements disposed on both the first and second silicon devices, in accordance with a total delay of a first synchronization message transmitted from the first silicon device to the second silicon device and a total delay of a second time synchronization message transmitted from the second silicon device to the first silicon device; and
minimizing the offset between the timers of the first and second silicon devices.

8. The method of claim 7, wherein determining the offset comprises:
subtracting a communication delay over the interconnect between the first and second silicon devices from the total delay observed between the first and second silicon devices.

9. The method of claim 7, wherein minimizing the offset comprises:
adjusting at least one of the timers of the first and second silicon devices.

10. The method of claim 9, wherein adjusting at least one of the timers comprises:
adjusting a rate at which at least one of the timers of the first and second silicon devices is incremented.

11. The method of claim 9, wherein adjusting at least one of the timers comprises:
periodically writing a timer value from the timer of the first silicon device into the timer of the second silicon device.

12. The method of claim 7, further comprising:
sending a timer value from the timer of the first silicon device to slave timers of each of the processing elements of the first silicon device; and
sending a timer value from the timer of the second silicon device to slave timers of each of the processing elements of the second silicon device.

13. An apparatus comprising:
a first silicon device configured in accordance with an Advanced RISC Machines™ (ARM) architecture, the first silicon device having a timer and at least one processing element;
a second silicon device configured in accordance with the ARM architecture, the second silicon device having a timer and at least one processing element; and
an interconnect coupled between the first silicon device and the second silicon device such that both the first and second silicon devices have access to any of the processing elements disposed on both the first and second silicon devices,
at least one of the first and second silicon devices configured to:
determine an offset between the timer of the first silicon device and the timer of the second silicon device in accordance with a total delay of a first synchronization message transmitted from the first silicon device to the second silicon device and a total delay of a second time synchronization message transmitted from the second silicon device to the first silicon device, and
minimize the offset by adjusting at least one of the timers of the first and second silicon devices.

14. The apparatus of claim 13, wherein at least one of the first and second silicon devices is configured to minimize the offset by adjusting a rate at which at least one of the timers of the first and second silicon devices is incremented.

15. The apparatus of claim 13, wherein at least one of the first and second silicon devices is configured to minimize the offset by periodically writing a timer value from the timer of the first silicon device into the timer of the second silicon device.

16. The apparatus of claim 13, wherein each of the processing elements of the first silicon device comprises a slave timer configured to receive a timer value from the timer of the first silicon device, and each of the processing elements of the second silicon device comprises a slave timer configured to receive a timer value from the timer of the second silicon device.

17. The apparatus of claim 13, wherein the at least one of the first and second silicon devices is configured to:
determine an offset between the timer of the first silicon device and the timer of the second silicon device by subtracting a communication delay over the interconnect between the first and second silicon devices from the total delay observed between the first and second silicon devices.

18. A non-transient computer-readable memory comprising:
executable instructions that when executed by at least one processor of an electronic design automation system (or integrated circuit fabrication system), that when executed cause the at least one processor to:
provide a first silicon device configured in accordance with an Advanced RISC Machines™ (ARM) architecture, the first silicon device having a timer and at least one processing element;
provide a second silicon device configured in accordance with the ARM architecture, the second silicon device having a timer and at least one processing element;
provide an interconnect coupled between the first silicon device and the second silicon device such that both the first and second silicon devices have access to any of the processing elements disposed on both the first and second silicon devices; and
at least one of the first and second silicon devices configured to determine an offset between the timer of the first silicon device and the timer of the second silicon device in accordance with a total delay of a first synchronization message transmitted from the first silicon device to the second silicon device and a total delay of a second time synchronization message transmitted from the second silicon device to the first silicon device.

\* \* \* \* \*